United States Patent Office 3,740,397
Patented June 19, 1973

3,740,397
1-(3,5-DIALKOXY-PHENOXY)-2-(TERTIARY AMINO) ETHANES
Louis Lafon, Paris, France, assignor to Societe Orsymonde, Paris, France
No Drawing. Filed Apr. 27, 1970, Ser. No. 32,444
Claims priority, application Great Britain, Apr. 29, 1969, 21,889/69
Int. Cl. C07d 87/32
U.S. Cl. 260—247.7 C                6 Claims

ABSTRACT OF THE DISCLOSURE

New compounds of the general formula:

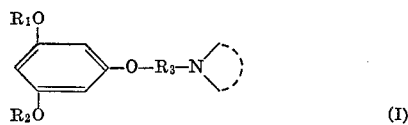
(I)

where $R_1$ and $R_2$, which can be the same, each represent a lower alkyl radical of order $C_1$–$C_3$; $R_3$ represents a straight or branched alkylene radical; and

is a group selected from the aliphatic and N-heterocyclic amino groups, the latter amino group being capable of containing a second hetero atom; and their acid addition salts.

These compounds are obtained by the condensation in alcohol, in the presence of sodium, of a 3′,5′-dialkoxy phenol on a chloroalkylamine:

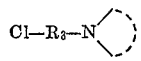

The compounds of Formula I and their acid addition salts are therapeutically useful.

---

The present invention relates to amine derivatives of phloroglucinol corresponding to the general formula:

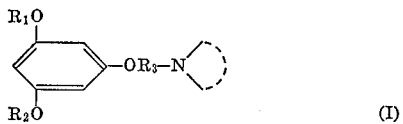
(I)

in which $R_1$ and $R_2$ are the same or different and each represents a lower alkyl radical comprising not more than 3 carbon atoms and particularly methyl or ethyl; $R_3$ represents a straight or branched alkylene radical; and

is an aliphatic or N-heterocyclic amine group which may, if required, contain a second hetero atom and can be such as piperidino, pyrrolidino, piperazino, morpholino or thiomorpholino, as well as their salts.

The present invention is also concerned with therapeutically useful compositions containing these compounds as well as their non-toxic acid addition salts and their non-toxic quaternary ammonium salts as active ingredients. It has been discovered that these derivatives are of interest as antispasmodic, choleretic, tranquillising, and vasodilating agents.

The compounds according to the invention are prepared by the condensation in an alcohol, preferably ethanol, in the presence of sodium previously dissolved in the same alcohol, of a phenol disubstituted in the 3 and 5 positions of the formula:

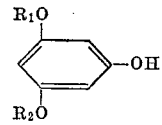
(II)

where $R_1$ and $R_2$ are as defined above, with a chlorinated alkylamine of the general formula:

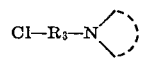
(III)

where

and $R_3$ are as defined above, or the hydrochloride of the said chlorinated alkylamine.

The quaternary ammonium salts are obtained by the reaction of the free base of Formula I with a mineral ester, preferably methyl iodide.

By way of illustration, various non-limitative examples of the compounds of the invention are given below.

EXAMPLE 1

1-(3′,5′-dimethoxy-phenoxy)-2-(N,N-diethylamino)-ethane hydrochloride

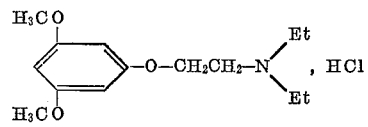

In order to prepare this product, 4.6 g. (0.2 gram atom) of sodium was reacted with 125 cc. of ethanol and, when the sodium had disappeared, 15.4 g. (0.1 mole) of 3,5-dimethoxy-phenol in solution in 50 cc. of absolute ethanol was added, followed by 17.2 g. (0.1 mole) of 1-chloro-2-diethylamino-ethane hydrochloride in suspension in 25 cc. of ethanol. The mixture was maintained under reflux for 6 hours and then the precipitated NaCl was separated after standing, and the alcoholic solution was concentrated. It was taken up in 50 cc. of ether and ethereal HCl was slowly added under reduced pressure. The mixture was filtered after cooling in ice and was dried under reduce pressure over potash. For purification, the product was recrystallised from 200 cc. of boiling isopropanol using vegetable carbon black.

16.4 g. (yield 56.7%) of white crystals melting at about 127° C. were obtained, which were soluble in water and slightly soluble in ethanol.

EXAMPLE 2

1-(3′,5′-dimethoxy-phenoxy)-2-morpholino-ethane hydrochloride

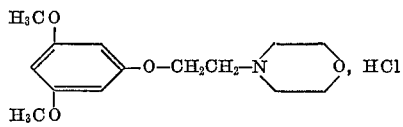

Proceeding as in Example 1, the 1-chloro-2-diethylamino-ethane hydrochloride was replaced by 18.6 g. (0.1 mole) of 1-chloro-2-morpholino-ethane hydrochloride. 20.6 g. (yield 68%) of a white crystalline powder melting at 160° C. was obtained, which was soluble in water and slightly soluble in ethanol.

EXAMPLE 3

1-(3′,5′-diethoxy-phenoxy)-2-(N,N-diethylamino)-ethane hydrochloride

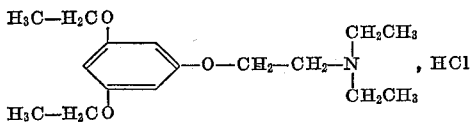

The procedure of Example 1 was followed with double the quantities of the constituents: 9.2 g. (0.4 gram atom) of sodium in 250 cc. of ethanol, 36.4 g. (0.2 mole) of 3,5-diethoxy-phenol in 100 cc. of ethanol, and 34.4 g. (0.2 mole) of 1-chloro-2-diethylamino-ethane hydrochloride in 50 cc. of ethanol. Recrystallisation was effected from 100 cc. of isopropanol.

38.4 g. (yield 60.3%) of white crystals melting at 122° C. were obtained, which were soluble in water, slightly soluble in ethanol, and insoluble in hydrocarbons.

EXAMPLE 4

1-(3′,5′-diethoxy-phenoxy)-2-morpholino-ethane hydrochloride

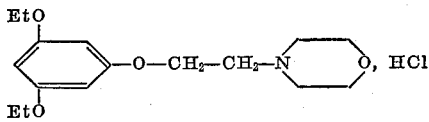

Starting from 2.3 g. (0.1 gram atom) of sodium in 60 cc. ethanol, 9.1 g. (0.05 mole) of 3,5-diethoxy-phenol in 25 cc. of ethanol, and 9.3 g. (0.05 mole) of 1-chloro-2-morpholino-ethane hydrochloride in 15 cc. of ethanol, 12 g. (yield 72.4%) of white crystals melting at 183°–184° C. were obtained after recrystallisation from 50 cc. of boiling isopropanol, which were soluble in water, slightly soluble in ethanol, and insoluble in hydrocarbons.

EXAMPLE 5

1-(3′5′-diethoxy-phenoxy)-2-(N,N-diethylamino)-ethane iodomethylate

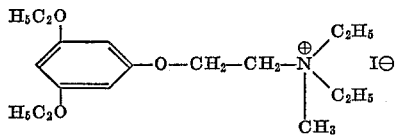

Starting from 15.9 g. (0.05 mole) of the hydrochloride of Example 3, the corresponding base was prepared, which was then dried and the isolated base was taken up in 30 cc. of ethanol; then, 14.2 g. (0.1 mole) of methyl iodide was added dropwise and a slight reflux was maintained for 2 hours. The mixture was cooled in ice, diluted with agitation with 150 cc. of ether and allowed to crystallise overnight at 0° C. The mixture was filtered, washed with ether and dried under reduced pressure.

20.2 g. (yield 95.5%) of white crystals melting at 96° C. was obtained, which were soluble in water and ethanol and insoluble in ether and hydrocarbons.

EXAMPLE 6

1-(3′,5′-dimethoxy-phenoxy)-2-piperidino-ethane hydrochloride

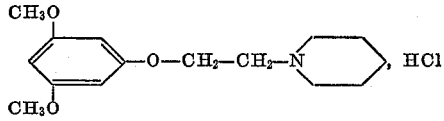

200 cc. of absolute ethanol was introduced with agitation into a 500 cc. three-necked flask with refrigeration, agitation and thermometer. 9.2 g. (0.4 gram atom) of sodium was then slowly added. When all the sodium had disappeared, 30.8 g. (0.2 mole) of 3,5-dimethoxy-phenol in solution in 100 cc. of absolute ethanol was added, followed by 36.8 g. (0.2 mole) of 1-chloro-2-piperidino-ethane hydrochloride.

The mixture was brought to reflux and boiling was maintained for 6 hours. It was left overnight, the sodium chloride was filtered off, and the alcoholic solution was then concentrated. The resulting concentrate was taken up in 300 cc. of ether, washed twice with 200 cc. of water, the ethereal layer was dried over sodium sulphate and then filtered off. 50 cc. of 6 N ethereal HCl was added slowly with agitation, the mixture was cooled in ice, and left to settle. The result was filtered, washed in ether, and dried over potash under reduced presure. Recrystallisation from 250 cc. of boiling isopropanol with carbon black yielded 40 g. of a white crystalline powder which was very soluble in water. Yield: 66%, melting point: 184° C.

EXAMPLE 7

1-(3′,5′-dimethoxy-phenoxy)-2-morpholino-ethane iodomethylate

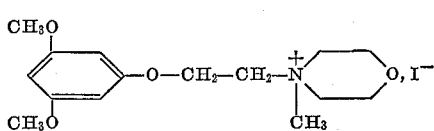

(A) A solution of 15.2 g. (0.05 mole) of 1-(3′,5′-dimethoxy-phenoxy)-2-morpholino-ethane hydrochloride in 60 cc. of water was introduced into a 250 cc. decanter flask, and then 10 cc. of washing soda was added slowly and extracted twice with 100 cc. of ether. The ether was dried over soidum sulphate and evaporated to dryness under reduced pressure.

(B) The thus isolated base was dissolved in 30 cc. of absolute ethanol and the solution was introduced into a 250 cc. balloon flask with refrigerant and agitator. 14.2 g. (0.10 mole) of methyl iodide was added dropwise. The reaction was self-starting and the iodomethylate was precipitated whilst agitation was maintained for two hours. 100 cc. of ether was then added and the mixture was left to crystallise overnight at about 0° C. The result was filtered, washed in ether, and dried under reduced presure. 14.6 g. of white crystals was obtained.

Yield: 71.5, melting point: 188° C.

EXAMPLE 8

1-(3′,5′-dimethoxy-phenoxy)-2-(N,N-diethylamino)-ethane iodomethylate

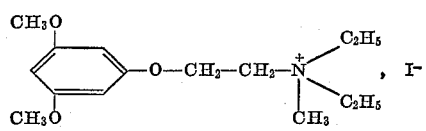

(A) A solution of 24.5 g. (0.084 mole) of 1-(3′,5′-dimethoxy-phenoxy) - 2-(N,N-diethylamino)-ethane hydrochloride in 70 cc. of water was introduced into a 250 cc. decanter flask. 10 cc. of washing soda was added slowly and extracted twice with 100 cc. of ether. The ether was dried over sodium sulphate and evaporated to dryness under reduced pressure.

(B) The thus isolated base was dissolved in 30 cc. of absolute ethanol and introduced into a 250 cc. balloon flask with refrigerant and agitator. 24 g. (0.168 mole) of methyl iodide was added dropwise. The reaction was self-starting and the temperature rose to 48° C.

The mixture was left for 3 hours under agitation without external heating, and then 100 ml. of anhydrous ether was poured in to precipitate the iodomethylate. Filtration and washing was then carried out. Recrystallisation from 160 cc. of propanol yielded 26.5 g. of a white crystalline powder which was 2.5% soluble in water.

Yield: 79.4%, melting point=120° C.

EXAMPLE 9

1-(3',5'-dimethoxy-phenoxy)-2-piperidino-ethane iodomethylate

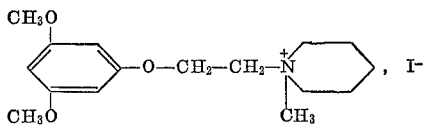

(A) A solution of 15.07 g. (0.05 mole) of 1-(3',5'-dimethoxyphenoxy) - 2 - piperidino-ethane hydrochloride in 60 cc. of water was introduced into a 250 cc. decanter flask. 10 cc. of washing soda was added slowly in the cold state and extracted twice with 100 cc. of ether. The ether was dried over sodium sulphate and evaporated to dryness under reduced pressure.

(B) The thus isolated base was then dissolved in 30 cc. of absolute ethanol and introduced into a 250 cc. ballon flask with refrigerant and agitator. 14.2 g. (0.1 mole) of methyl iodide was added dropwise and the mixture was heated under slight reflux for two hours. It was cooled and 100 cc. of ether was added. The iodomethylate was precipitated and left overnight at about 0° C. The result was filtered off, washed in ether, and dried under vacuum. Recrystallisation from 100 cc. of propanol gave 15.7 g. of a slightly yellow crystalline powder which was about 2% soluble in water. Yield: 66.8%, melting point=131° C.

The properties of the various products above have been studied by way of pharmacological tests. The results relating to acute toxicity are set out in the accompanying Table I.

The antispasmodic activity has been studied in vitro on rat duodenum and isolated guinea pig ureter by noting the decontraction obtained on the treated organs using barium chloride and acetylchloline; it has been studied in vivo on guinea pig ileus by measuring the inhibition of peristalsis and the hypotensive action. The action on choleresis has been demonstrated in anaesthetised rats. The results are summarised in the accompanying Table II.

In this table, it is shown that the five products are antispasmodic agents and that product 2 is strongly choleretic, while product 4 has a weak choleretic effect.

Also as regards the product of Example 1, it has been shown by complementary tests that:

(1) the compound has a clear antispasmodic effect on the intestine and on Oddi's sphincter in dogs at a dose of 7.4 mg./kg. given intravenously;

(2) in dogs at doses of 7.5 and 15 mg./kg. given intravenously, it does not decrease the hypercholeretic activity of sodium dehydrocholate but, on the contrary, adds its own activity;

(3) rabbits have good tolerance to intravenous injections of the product;

(4) the tranquillising action is shown by a diminution in the spontaneous motility of mice to 63% with a dose of 40 mg./kg. given intramuscularly, 15 to 20 minutes after injection, and to 80% after 20 to 25 minutes. This effect appears more rapidly than with Meprobamate in a dose of 300 mg./kg.

(5) 1 - (3',5' - dimethoxy-phenoxy) - 2 - (N,N-diethylamino)-ethane hydrochloride has vasodilative properties. The percentage increase in the femoral arterial output in an anaesthetised dog was +12% with an intra-arterial dose of 10 mcg., +56% with 100 mcg., +91% with 1 mg., and +344% with 10 mg.

As regards the product of Example 2, the complementary tests were concerned with the sub-acute toxicity in rats and with its action on the central nervous system. To study the sub-acute toxicity four groups of 10 rats (5 males, 5 females) were taken, each group being formed by the drawing of lots:

Group T (control) The animals received by force feeding a daily dose of 1 ml./100 g. of physiological serum.

Group A: The animals received a daily dose of 300 mg./kg. mixed with their food.

Group B: The animals received by force feeding in doses increasing every 4 days, 150 mg./kg./day, then 300 mg./kg./day, then 450 mg./kg./day, and finally 700 mg./kg./day.

Group C: The animals received by force feeding in doses increasing every 8 days. 300 mg./kg./day, then 600 mg./kg./day.

The animals of group A which had received the product of Example 2 in a dose of 300 mg./kg./day mixed in with their food did not show any peculiar symptoms.

The animals of groups B and C which received the product of Example 2 in increasing doses showed, starting at 300 mg./kg./day and 15 to 30 minutes after ingestion, hypotonia with loss of balance which could sometimes lead to loss of the turning reflex. Furthermore, slight hypothermia and peripheral vasodilation was also observed.

With the dose of 600 mg./kg. both growth and also the alimentary consumption, was slowed down.

The accompanying Tables IIIa, IIIb and IIIc contain the results of the actions of the product of Example 2 on the central nervous system of mice, rats and dogs, respectively.

1-(3',5'-diethoxy-phenoxy) - 2 - (N,N-diethylamino)-ethane hydrochloride (product of Example 3) has inferior peripheral vasodilative properties to those of papaverine. In anaesthetised dogs and awakened rabbits, it increased the respiratory amplitude.

1-(3',5'-diethoxy-phenoxy)-2-morpholino-ethane hydrochloride (product of Example 4) exerted a vasodilative effect which was close to but slightly less than that of papaverine.

The iodomethylate of Example 5 is antihistaminic. In an intravenous dose of 0.8 mg./kg., it reduced the bronchoconstrictive action of histamine in dogs by 47% for 40 minutes.

In dogs, the hydrochloride of Example 6 inhibited bronchospasms due to histamine for 15 minutes (2 animals), and reduced bronchospasms by 80% (1 animal) with an intravenous dose of 5.4 mg./kg. The product of Example 6 in an intravenous dose of 5 mg./kg. did not alter the biliary output of anaesthetised rats (9 animals). Its peripheral vasodilative action on the femoral arterial circulation of anaesthetised dogs was studied. Table IVa compares the relative results of an intra-arterial injection of the product of Example 6 with a similar injection of papaverine, and Table IVb shows the relative results of 1-(3',5'-dimethoxyphenoxy)-2-piperidino-ethane hydrochloride administered intravenously.

With a local injection or a rapid intravenous injection, the product of Example 6 exerted a peripheral vasodilative effect; but with slow perfusion at a dose equal to 1/10 of the DL-50 I.V. for mice, the concentration was no longer sufficient to produce vasodilation. It was also ascertained that with rapid injections vasodilation is contemporaneous with hypotension.

In clinical tests it has been proved that the product of Example 1 utilised intravenously is an active antispasmodic in cases of colitis; for human therapeutic treatment ampoules containing 5, 10 or 20 mg. of active constituent or 5 ml. of isotonic sodium chloride solution are advantageously utilised.

Clinical tests have also shown, in respect of the product of Example 2, favourable results in the treatment of intestinal pains and hepatic colics. Moreover, it has been practicable to carry out radiological examinations of the stomach in 10 patients after an intravenous injection of an ampoule of 50 mg. of the product of Example 2. All the transits have been compared with the transits previously carried out with the same patient. The activity of the product only appeared 12 to 15 minutes after the injection.

As far as the stomach is concerned, the tonicity and contractability were maintained. The duodenum was overtaken by a first passage which was very rapid, except in one observation where it was necessary to wait 10 minutes. The duodenal contractability remained good; the bulb contracted well and the duodenal passages were brought together.

The excellent tolerance to the product in human being permitted the aforesaid initial dose to be increased. The product was utilised therapeutically in cachets or pastilles in doses of 100 to 200 mg. of active constituent at a rate of 4 to 6 times a day in the treatment of intestinal spasms. As a tranquilliser it has been utilised intravenously in ampoules of 50 mg. to 100 mg. per 2 ml. of isotonic solution.

In human beings, the product of Example 3 was successfully administered intravenously in the treatment of biliary pains (hepatic colic) in the form of an ampoule of the following composition:

Product of Example 3: 6 mg.
Isotonic solution of NaCl at 9 g./l. q.s.p. 5 ml., the ampoules being administered at the rate of 3 to 6 per day.

1-(3′,5′-diethoxy-phenoxy)-2-morpholino-ethane hydrochloride has been successfully used in the treatment of enterocolitis and intestinal spasms in the form of injectable ampoules containing 8 to 20 milligrammes of active constituent for 2 ml. of isotonic solution, and in the form of tablets or pastilles containing 50 mg. of active constituent, at a rate of three to six ampoules, tablets or pastilles per day.

TABLE I

| Products | $DL_{50}$ intravenously in mice, mg./kg. | Observations in mice |
|---|---|---|
| Example 1 | 74±3 | In a dose of 40 mg./kg. I.M.: sedation, hypothermia, no analgesic action, mydriasis, by gastric administration, $DL_{50}=260±64$ mg./kg. |
| Example 2 | 190±5 | In a dose of 100 mg./kg. I.M.: sedation, ptosis, mydriasis and hypothermia, by oral administration, $DL_{50}=1,190±99$ mg./kg. |
| Example 3 | 54±5 | In a dose of 27 mg./kg. I.M.: no symptoms except slight hypothermia (+0.3° C.), by gastric administration, $DL_{50}=700$ mg./kg. |
| Example 4 | 175±13 | In a dose of 87 mg./kg. I.M.: sedation, polypnea, slight mydriasis, by gastric administration, no toxicity up to a dose of 1 g./kg. |
| Example 6 | 50±3 | In a dose of 27 mg./kg. I.M.: no symptoms except slight hypothermia (+0.9° C.) |

TABLE II

| Products of examples | 1 | 2 | 3 | 4 | 5 |
|---|---|---|---|---|---|
| Test on isolated rat duodenum: | | | | | |
| Decontraction vis-a-vis $BaCl_2$ | 62% at 36 μg./ml. | DE-50, 50 μg./ml. | DE-50, 25 μg./ml. | DE-50, 50 μg./ml. | DE-50, 2.5 μg./ml. |
| Decontraction vis-a-vis acetylcholine | 91% at 73 g./ml. | DE-50, 50 μg./ml. | DE-50, 5 μg./ml. | DE-50, 50 μg./ml. | DE-50, 2 μg./ml. |
| Test on isolated guinea pig ureter: Decontraction vis-a-vis $BaCl_2$ (inhibiting dose) | 740 μg./ml. | 76 μg./ml. | 50 μg./ml. | Diminution of 50% at 10 μg./ml.; diminution of 90% at 50 μg./ml. | Inactive at 5 μg./ml.; diminution of 40% at 10 μg./ml.; inhibition at 50 μg./ml. |
| Test on guinea pig ileus in situ: Dose for inhibiting peristalsis given intravenously | 3 and 7.4 mg./kg. during 13 to 30 mins. | 20 mg./kg. | 5 mg./kg. (4 tests out of 5). | 15/mg./kg. (3 tests out of 4) | In a dose of 5 mg./kg. the peristaltic index decreased bb 87%. |
| Hypotension in anaesthetised dogs, administered intravenously | | 66 percent | 40 percent | 25 to 50 percent | |
| Choloretic index (anaesthetised rats): | | | | | In a dose of 5 mg./kg. I.V. no change in the biliary output. |
| (1) Intraduodenally | 3 | | | Slight hypercholeretic effect intravenously. | |
| (2) Intraileally | 21 | | | | |
| (3) Intravenously | 132 | | | | |

TABLE IIIa
Action on the central nervous system in mice

| Test | Doses (mg./kg.) | Administration | Number of animals | Effects |
|---|---|---|---|---|
| Spontaneous motility | 50 | I.M. | 6 | −30% (15 to 25 min.). |
|  | 100 | I.M. | 6 | −57%[1] (15 to 25 min.). |
| Sleep potential with chloral hydrate | 100 | I.M. | 9 | +104%. |
| Sleep potential with hexabarbital | 100 | I.M. | 9 | +64%.[1] |
| I.P. injection of acetic acid | 100 | I.M. | 10 | Nil. |
| Anticonvulsive action with respect to pentetrazol | 300 | I.M. | 6 | Clonic convulsions: none. Tonic convulsions: slight protection. |
|  | 450 | I.M. | 6 | Clonic convulsions: none. Tonic convulsions: protection 100%. |
|  | 600 | I.M. | 6 | Hypnotic action. |
| Haffner (pinching of the tail) | 100 | I.M. | 12 | Nil. |
| Eddy (heated plate) | 100 | I.M. | 12 | Nil. |

[1] P statistically significant P <0.02.

TABLE IIIb
Action on the central nervous system of rats

| Test | Dose (mg./kg.) | Administration | Number of animals | Effect |
|---|---|---|---|---|
| Cataleptigenic action | 150 | I.V. | 9 | No cataleptic effect but loss of turning reflex. |
|  | 600 | I.M. | 3 | Nil. |
|  | 750 | I.M. | 3 | Hypotonia, no catalepsy. |
|  | 900 | I.M. | 3 | Hypnotic effect for >3 hours. |
| Anti-apomorphine action | 600 | I.M. | 3 | Nil in 1 hour 30 minutes. |
| Anti-amphetamine action | 300 | I.M. | 4 | Protection 100%. |
| Adrenolitic action (PA anaethetised rat) | 200 | I.M. | 4 | Nil. |
|  | 400 | I.M. | 4 | Diminution of 20%. |

TABLE IIIc
Action on the central nervous system of dogs

| Test | Dose (mg./kg.) | Administration | Number of animals | Effect |
|---|---|---|---|---|
| Anti-apomorphine action | 50 | I.M. | 2 | Reduction of 50% in the number of vomits. Slightly retarded appearance |

TABLE IVa

| Arterial pressure | Femoral output, ml./min. | Dose | Increase in the femoral output, percent | Diminution of the femoral resistance, percent (duration) | Papaverine dose | Increase in the femoral | Diminution of the femoral resistance, percent (duration) |
|---|---|---|---|---|---|---|---|
| 0 | 13 | 10 meg | 15 | 13 (1′) | 1 meg | 6 | −5 (30′) |
| 0 | 13 | 100 meg | 38 | 27 (1′) | 10 meg | 29 | −22 (1′) |
| 0 | 14 | 1 mg | 78 | 43 (1′30′′) | 100 meg | 35 | −26 (1′) |
| 0 | 13 | 10 mg | 200 | 66 (2′) | 1 mg | 200 | −66 (1′) |

TABLE IVb

| Dose | Mode of administration | Diminution of the arterial pressure (duration) | Femoral output, ml./min. | Variation in the femoral output | Femoral resistance | Duration of the action, minutes |
|---|---|---|---|---|---|---|
| 5 | Injection in 2′ | −15 (2′) | 39 | +38 | −37 | 2 |
| 5 | do | 0 | 35 | +35 | −30 | 30 |
| 5 | Injection in 1′30 | −45 (1′) | 22 | −32 then +105 | −55 | 4 |
| 5,4 | Perfusion in 36′ | 0 | 68 | 0 | 0 | |

I claim:

1. 1 - (3′,5′ - dimethoxy-phenoxy)-2-N,N-diethylamino ethane, its non-toxic acid addition salts or its quaternary ammonium methyliodide thereof.

2. 1 - (3′,5′-dimethoxy-phenoxy)-2-morpholino ethane, its non-toxic acid addition salts or its quaternary ammonium methyliodide thereof.

3. 1 - (3′,5′ - diethoxy-phenoxy)-2-N,N-diethylamino ethane, its non-toxic acid addition salts or its quaternary ammonium methyliodide.

4. 1-(3′,5′-diethoxy-phenoxy)-2-morpholino ethane, its non-toxic acid addition salts or its quaternary ammonium methyliodide thereof.

5. 1-(3′,5′-dimethoxy-phenoxy)-2-piperidino ethane, its non-toxic acid addition salts or its quaternary ammonium methyliodide thereof.

6. A compound of the formula

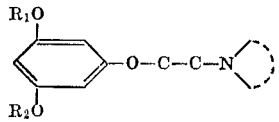

wherein $R_1$ and $R_2$ are $C_1$ to $C_3$ alkyl;

is selected from the group consisting of dimethylamino, piperidino, pyrrolidino and morpholino; and the non-toxic acid addition salts thereof or the quaternary methyl iodide.

References Cited
UNITED STATES PATENTS

| | | | |
|---|---|---|---|
| 2,688,639 | 9/1954 | Gump | 260—570.7 |
| 2,765,338 | 10/1956 | Suter et al. | 260—570.7 |
| 2,966,518 | 12/1960 | Johnson | 260—570.7 |

ALEX MAZEL, Primary Examiner

J. TOVAR, Assistant Examiner

U.S. Cl. X.R.

260—243 B, 268 R, 293.83, 326.5 M, 570.7; 424—248